H. F. MORRIS & B. F. EAVES.
HOOF TRIMMER AND CUTTER.
APPLICATION FILED AUG. 19, 1909.
989,793.
Patented Apr. 18, 1911.
2 SHEETS—SHEET 2.
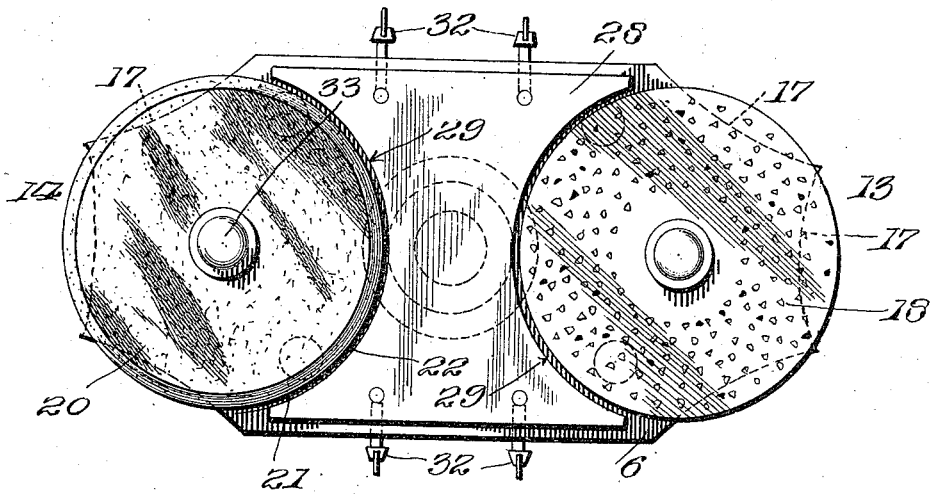
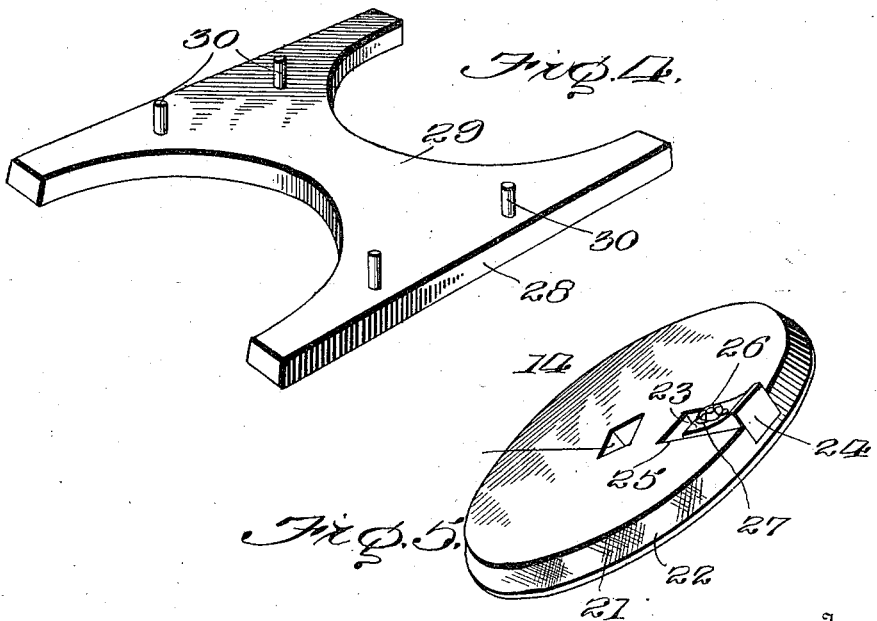
Witnesses
W. T. Woodson.
Juana M. Fallin.
Inventors
H. F. Morris
B. F. Eaves
By
H. W. A. Macy, Attorneys.

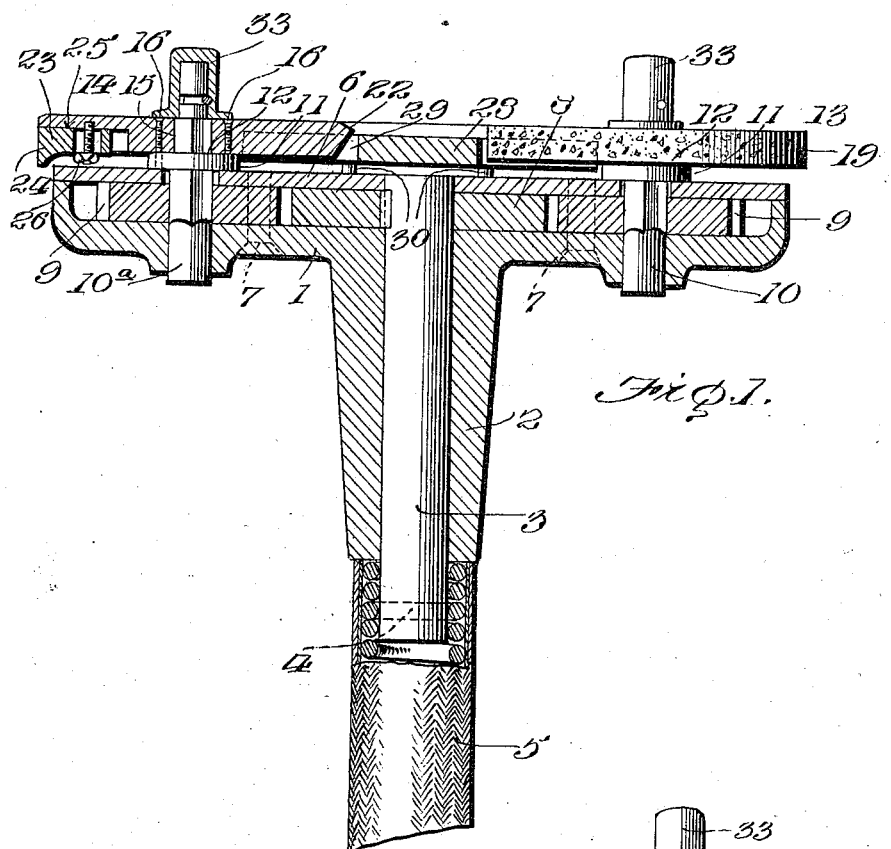

UNITED STATES PATENT OFFICE.

HENRY F. MORRIS AND BENJAMIN F. EAVES, OF DRAKETOWN, GEORGIA.

HOOF TRIMMER AND CUTTER.

989,793.  Specification of Letters Patent.  Patented Apr. 18, 1911.

Application filed August 19, 1909. Serial No. 513,638.

*To all whom it may concern:*

Be it known that we, HENRY F. MORRIS and BENJAMIN F. EAVES, citizens of the United States, residing at Draketown, in the county of Haralson and State of Georgia, have invented certain new and useful Improvements in Hoof Trimmers and Cutters, of which the following is a specification.

The present invention comprehends certain new and useful improvements in tools for use in farriery, and the invention has for its object an improved tool which embodies simultaneously driven rotary cutting disks, one of which serves to clean and trim the hoof to permit the shoe to be seated evenly thereon, and the other of which is adapted to cut off the nails that fasten the shoe and to effectually clench the same.

A further object of the invention is a tool of this character equipped with an adjustable plate which is interposed between and arranged in operative relation to the cutting disks and serves to regulate the amount of the hoof that is trimmed, and also to guide the tool in its movement.

A still further object of the invention is a tool which embodies to a marked degree the characteristics of simplicity and durability, which is compact in structure and particularly efficient in operation, and which is portable and is susceptible of being readily manipulated by one person.

With these and other objects in view that will more fully appear as the description proceeds, the invention consists in certain constructions and arrangements of the parts that we shall hereinafter fully describe and then point out the novel features thereof in the appended claims.

For a full understanding of the invention and the merits thereof, and to acquire a knowledge of the details of construction, reference is to be had to the following description and accompanying drawings, in which:

Figure 1 is a longitudinal section of a tool constructed in accordance with our invention; Fig. 2 is a transverse section thereof; Fig. 3 is a front end view; Fig. 4 is a detail perspective view of the gage plate detached; and, Fig. 5 is a similar view of one of the cutting disks.

Corresponding and like parts are referred to in the following description and indicated in all the views of the drawings by the same reference characters.

Our improved tool embodies a body portion 1 that in the present instance is in the form of a substantially flat elongated casing from the rear side of which is extended a tubular handle 2 of a convenient size to be grasped in the hand of the operator. A drive shaft 3 is journaled in the tubular handle with its rear end projecting therebeyond and formed with an aperture 4 or otherwise suitably adapted for detachable connection with the flexible shaft 5 by means of which power is applied to the tool, the flexible shaft being driven from an electric motor or any other suitable source of power (not shown). At its forward end the drive shaft is extended into the casing and is journaled in a face plate 6 mounted at the front side thereof and constituting the working face of the tool, the face plate being detachably secured to the main portion of the casing through the medium of screws 7 or similar fastening devices.

Keyed or otherwise rigidly mounted upon the drive shaft within the casing is a gear wheel 8 which meshes at substantially diametrically opposite points with pinions 9 fixed on spindles 10 and 10$^a$, the spindles being arranged on opposite sides of and parallel to the drive shaft, and being journaled in the opposite end portions of the casing. The spindles are extended forwardly through the face plate 6 and are formed with collars 11 adapted to bear against the latter to brace the spindles against rearward displacement, the collars also providing forwardly facing shoulders 12.

13 and 14 designate cutting disks that are formed with central openings 15 and are slipped over the forwardly projecting portions of the respective spindles and against the shoulders 12 and are fastened to the collars by one or more screws 16, the central openings 15 of the cutting disks and the portions of the spindles received in the same being preferably angular in cross section, as shown. The cutting disks are spaced apart in the direction of the length of the casing, and in the present instance, the latter is formed in its side and end edges with concave recesses 17 that permit the marginal portions of the disks to project outwardly therebeyond.

The cutting disk 13 is designed for use in cleaning and trimming the horse's hoofs, and for this purpose it is roughened in its outer face to provide a rasp 18, and has its periphery serrated to form another rasp 19. For convenience, the other disk 14 is formed in its outer face with a fine rasp 20 for dressing the hoof after it has been cleaned and trimmed with the rasps 18 and 19. The periphery of the disk 14 is provided with file teeth 21, and has a double bevel, as shown, in order to form a circular cutting edge 22 for cutting off the nails that secure the shoe to the hoof. The bevel at the front of the disk is considerably less than the bevel at the back, and its purpose is to space the cutting edge 22 from the plane of the outer face of the disk so as to insure of the nails being cut off at points beyond the surface of the hoof, to permit the nails to be clenched. The clenching is effected by means of a block 23 carried at the rear face of the disk 14 and having an enlarged outer end 24 that projects rearwardly beyond the said face of the disk and constitutes an abutment which is adapted, upon the rotation of the disk to turn over the projecting ends of the nails. The enlarged end of the block is substantially flush with the periphery of the disk. The block is accommodated in a radial groove 25 and is held in different adjusted positions therein by a set screw 26 inserted through a slot 27 in the block.

In order to regulate the amount of material trimmed from the hoof with the rasps 18 and 20, we employ a gage plate 28 that is interposed between the cutting disks and is arranged to partially embrace both of the same, and for this purpose is formed in its opposite ends with segmental recesses 29. The gage plate has a plurality of guide pins 30 fixed thereto and projecting rearwardly therefrom and slidable in openings 31 formed at corresponding points in the face plate 6. The gage plate is thus adapted to be moved toward and away from the face plate, as desired, and is held in different adjusted positions by means of set screws 32 impinging against the respective guide pins 30. The gage plate is also designed to rest against the bottom of the hoof when the rasp 19 is in use, and serves to steady the tool to secure an even cut, and also to guide the tool as it is moved around the hoof.

Attention is particularly directed to the fact that the spindles 10 and 10$^a$ project forwardly beyond the respective cutting disks (see Fig. 1) and have thimbles 33 rotatably mounted thereon. This arrangement has been found particularly convenient in practice, as the thimbles may be rested against the hoof to steady the tool and assist in guiding the same in its movements.

In the practical use of the invention, the gage plate 28 is adjusted toward or away from the face plate, according to the extent to which the hoof is to be trimmed. Power is then applied to the drive shaft 3 by means of the flexible shaft 5, whereby the spindles and the cutting disks carried thereby are simultaneously rotated by virtue of their gearing connection with the drive shaft. The necessary cleaning and trimming of the hoof is effected by applying the rasps and the cutting disks thereto. The shoe is then secured to the hoof with the customary nails, and the projecting portions of the latter are cut off to the desired length by using the edge 22 of the disk 14, whereupon the block 23 is brought into use to clench the nails.

Having thus described the invention what is claimed as new is:

1. A hoof trimmer and cleaner comprising a body portion, a rotary cutting disk carried by the body portion and mounted on the exterior thereof, an extension projecting perpendicularly from the outer face of the cutting disk and disposed concentrically thereto to serve as a guide, and a member encircling the extension and free to rotate thereon.

2. A hoof trimmer and cleaner comprising a body portion, a rotary cutting disk arranged on the exterior of the body portion, a spindle extended centrally on both sides of the cutting disk, the spindle being journaled in the body portion on one side of the cutting disk, and a thimble mounted on the spindle on the other side of the cutting disk and free to rotate thereon, as and for the purpose specified.

3. A tool including a rotary cutting disk, and a guide member outstanding from one face of the cutting disk and disposed concentrically to the axis of rotation thereof, the guide member having an independent rotary movement relative to the cutting disk.

4. A tool including a body portion, a rotating spindle journaled in the body portion and extending outwardly from the same, a rotary cutter mounted upon the spindle adjacent to its outer end, and a guide mounted for independent rotation upon the outer extremity of the spindle.

5. A hoof trimmer and cleaner comprising an elongated body portion, a spindle journaled in the body portion and extending beyond one face of the same, a rotary cutting disk fixed on the extending portion of the spindle, and means for rotating the spindle, the body portion having concave recesses in its sides to permit of the marginal portion of the cutting disk to project therebeyond.

6. A tool including a body portion, a rotary cutter carried by the body portion and against one side thereof, and a guide mounted for independent rotation against the outer face of the cutter.

In testimony whereof we affix our signatures in presence of two witnesses.

HENRY F. MORRIS. [L. S.]
BENJAMIN F. EAVES. [L. S.]

Witnesses:
J. H. MITCHELL,
M. G. PERRY.

---

Copies of this patent may be obtained for five cents each, by addressing the "Commissioner of Patents, Washington, D. C."